United States Patent [19]
Seki et al.

[11] Patent Number: 5,462,308
[45] Date of Patent: Oct. 31, 1995

[54] OCCUPANT PROTECTING SYSTEM FOR VEHICLE

[75] Inventors: Kazuhiro Seki; Takashi Aoki; Shinichi Hirahara; Yasuki Motozawa, all of Wako, Japan

[73] Assignee: Honda Giken Kogyo Kabushiki Kaisha, Tokyo, Japan

[21] Appl. No.: 257,780

[22] Filed: Jun. 9, 1994

[30] Foreign Application Priority Data

Jun. 11, 1993 [JP] Japan .................................. 5-140914

[51] Int. Cl.$^6$ .................................................. B60R 21/08
[52] U.S. Cl. ........................ 280/749; 280/753; 280/730.2
[58] Field of Search ..................................... 280/748, 749, 280/751, 753, 730 A, 730 R, 728 R, 806, 728.2, 743.1, 730.1, 730.2; 180/282, 271

[56] References Cited

U.S. PATENT DOCUMENTS

| | | | |
|---|---|---|---|
| 2,806,737 | 9/1957 | Maxwell | 280/730 R |
| 3,687,485 | 8/1972 | Campbell | 280/749 |
| 4,130,298 | 12/1978 | Shaunnessey | 280/730 R |
| 4,569,534 | 2/1986 | Nalbandyan et al. | 280/742 |
| 5,265,903 | 11/1993 | Kuretake et al. | 280/730 A |
| 5,322,322 | 6/1994 | Bark et al. | 280/730 A |
| 5,333,898 | 8/1994 | Stutz | 280/730 A |

FOREIGN PATENT DOCUMENTS

| | | |
|---|---|---|
| 3-258636 | 11/1991 | Japan . |
| 1349097 | 3/1974 | United Kingdom . |
| 1438573 | 6/1976 | United Kingdom . |
| 2261636 | 5/1993 | United Kingdom . |
| WO80/01267 | 6/1980 | WIPO . |
| WO93/09977 | 5/1993 | WIPO . |

*Primary Examiner*—Margaret A. Focarino
*Assistant Examiner*—Paul N. Dickson
*Attorney, Agent, or Firm*—Armstrong, Westerman, Hattori, McLeland & Naughton

[57] ABSTRACT

An occupant protecting system for a vehicle includes a triangular shock absorbing member which is accommodated in a folded state within an accommodating casing mounted along a roof rail. The shock absorbing member is held stationarily at its front and rear ends to a vehicle body by fixing pins. A movable pin mounted at a lower end of the shock absorbing member is connected through a wire to a developing or unfolding device mounted to a center pillar. The developing or unfolding device includes a gas generator and a cylinder with a piston slidably received therein and coupled to the wire. When the gas generator is operated upon collision of the vehicle to force the piston in the cylinder downwardly by a high pressure gas generated by the gas generator, the movable pin is pulled down through the wire, so that the shock absorbing member is drawn out of the accommodating casing and developed into a triangular shape. Thus, the membrane-like shock absorbing member, when being accommodated, is compact in size and can easily be mounted in a narrow space in the vehicle body.

7 Claims, 13 Drawing Sheets

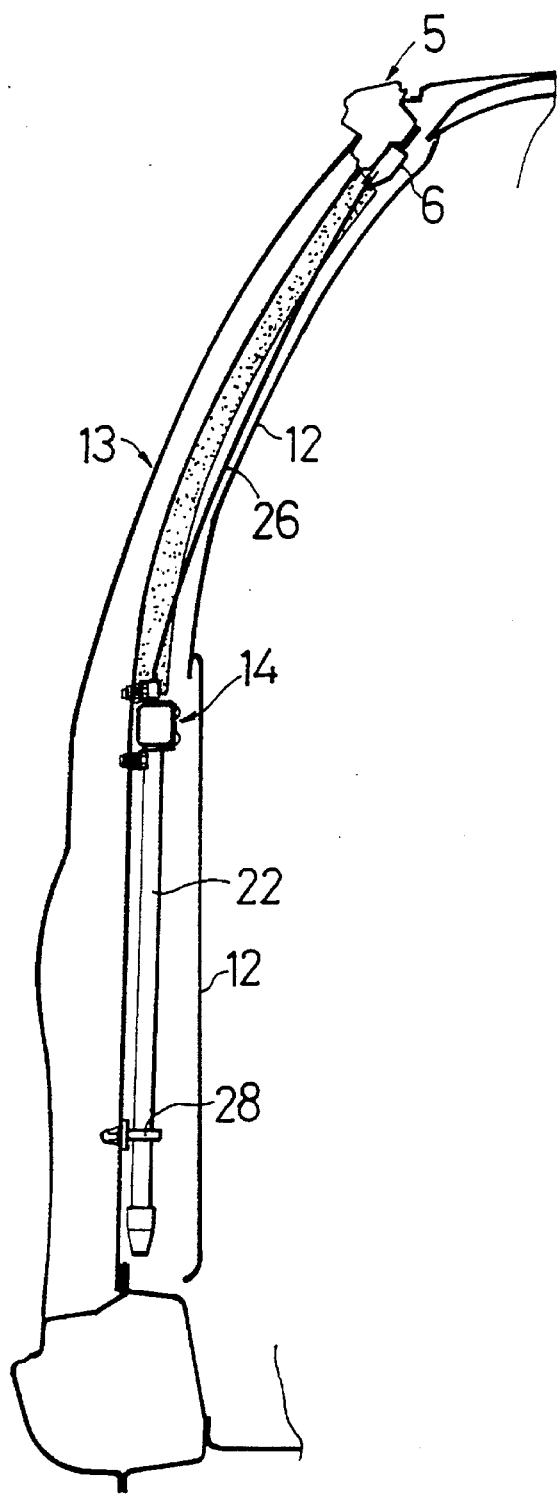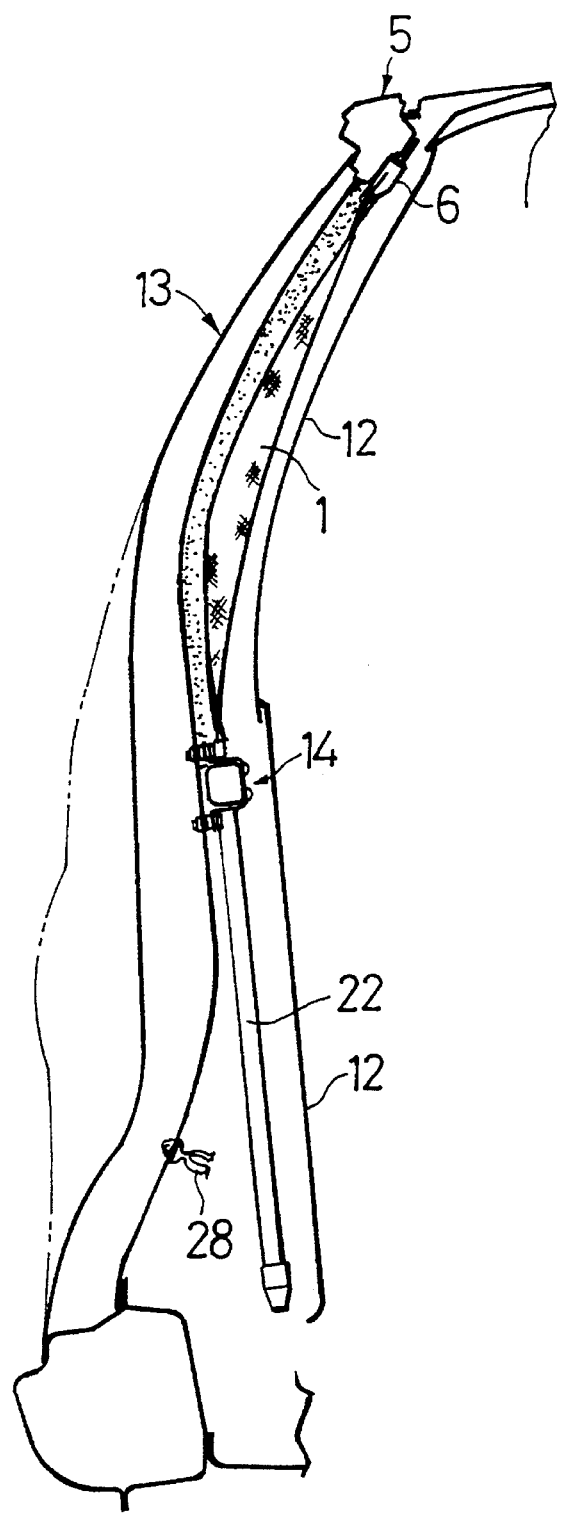

● Fixed point
○ Movable point

5,462,308

1
OCCUPANT PROTECTING SYSTEM FOR VEHICLE

BACKGROUND OF THE INVENTION

Field of the Invention

The present invention relates to an occupant protecting system for a vehicle, designed so that a membrane-like shock absorbing member is developed, or unfolded, between a vehicle body and an occupant upon collision of the vehicle.

Description of the Prior Art

A conventionally known occupant protecting system for a vehicle for protecting an occupant upon collision of the vehicle includes a so-called air bag system designed so that an air bag is inflated and developed from a steering wheel or an instrument panel with a high pressure gas. Such air bag system functions to mainly protect a front of an occupant's body upon frontal collision of the vehicle.

On the other hand, there is a conventionally proposed occupant protecting system designed so that an air bag is developed from a center pillar through a side of a seat to a position between an occupant and a door to protect a side of an occupant's body upon side collision of the vehicle (see Japanese Patent Application Laid-open No. 258636-91).

However, if the air bag system is accommodated at the center pillar, it is difficult to smoothly develop the air bag, because the development of the air bag is obstructed by a narrow space between the vehicle body and the side surface of the seat. If a sufficient space is insured in order to avoid this, the freedom of design of the seat is limited. Moreover, the accommodation of the air bag system results in a necessarily increased thickness of a center pillar, thereby providing a disadvantage of a large limitation in design.

SUMMARY OF THE INVENTION

Accordingly, it is an object of the present invention to provide an occupant protecting system for a vehicle, which is compact and smoothly developable.

To achieve the above object, according to the present invention, there is provided an occupant protecting system for a vehicle, comprising a membrane-like shock absorbing member which is unfoldable or developable between a vehicle body and an occupant upon collision of the vehicle and which includes points fixed to the vehicle body and a point movable along the vehicle body, and developing means for unfolding or developing the membrane-like shock absorbing member by moving the movable point away from at least one of the fixed points upon collision of the vehicle.

With the above construction, the membrane-like shock absorbing member, when being accommodated, is compact in size and can easily be mounted in a narrow space in the vehicle body. In addition, because the points fixed to the vehicle body and the point movable along the vehicle body are provided on the shock absorbing member, so that the movable point is moved away from the fixed points to unfold, or develop, the shock absorbing member, it is possible to reduce the space and the time required for development, as compared with the prior art air bag which is developed three-dimensionally. Thus, the shock absorbing member is smoothly and promptly developed without interference with the seat and the like. Moreover, the shock absorbing member, after being developed, is held stationarily at the fixed points and the movable point and hence, can exhibit a large shock absorbing effect.

The developing means may include a cylinder supported on the vehicle body, a piston slidably received in the cylinder, a wire connecting the piston to the movable point of the shock absorbing member, and a gas generator for generating a high pressure gas for driving the piston.

In an alternative embodiment, the developing means may include a guide sleeve supported on the vehicle body, a bag expandably accommodated in the guide sleeve and connected to the movable point, and a gas generator for generating a high pressure gas for expanding the bag.

In another alternative embodiment, the developing means may include a guide rail, supported on the vehicle body, for guiding the movable point on a hollow structure, forming at least a portion of the shock absorbing member, and a gas generator for generating a high pressure gas for developing the hollow structure of the shock absorbing member.

The shock absorbing member may be accommodated in an accommodating means provided at an end of a roof of the vehicle body and may be developed by moving the movable point by the developing means mounted to a pillar portion.

The accommodating means may be mounted to a roof rail and covered with a garnish.

The developing means may have a plurality of mounted points to the vehicle body, at least one of which may be separable from the vehicle body as a result of deformation of the periphery of the vehicle body.

A plurality of movable points may be provided on the shock absorbing member.

The above and other objects, features and advantages of the invention will become apparent from the following description of preferred embodiments, taken in conjunction with the accompanying drawings.

BRIEF DESCRIPTION OF THE DRAWINGS

FIGS. 3A and 3B are sectional views taken along a line 3—3 in FIG. 1, respectively;

DETAILED DESCRIPTION OF THE PREFERRED EMBODIMENTS

The present invention will now be described by way of preferred embodiments in connection with the accompanying drawings.

Figure 1:
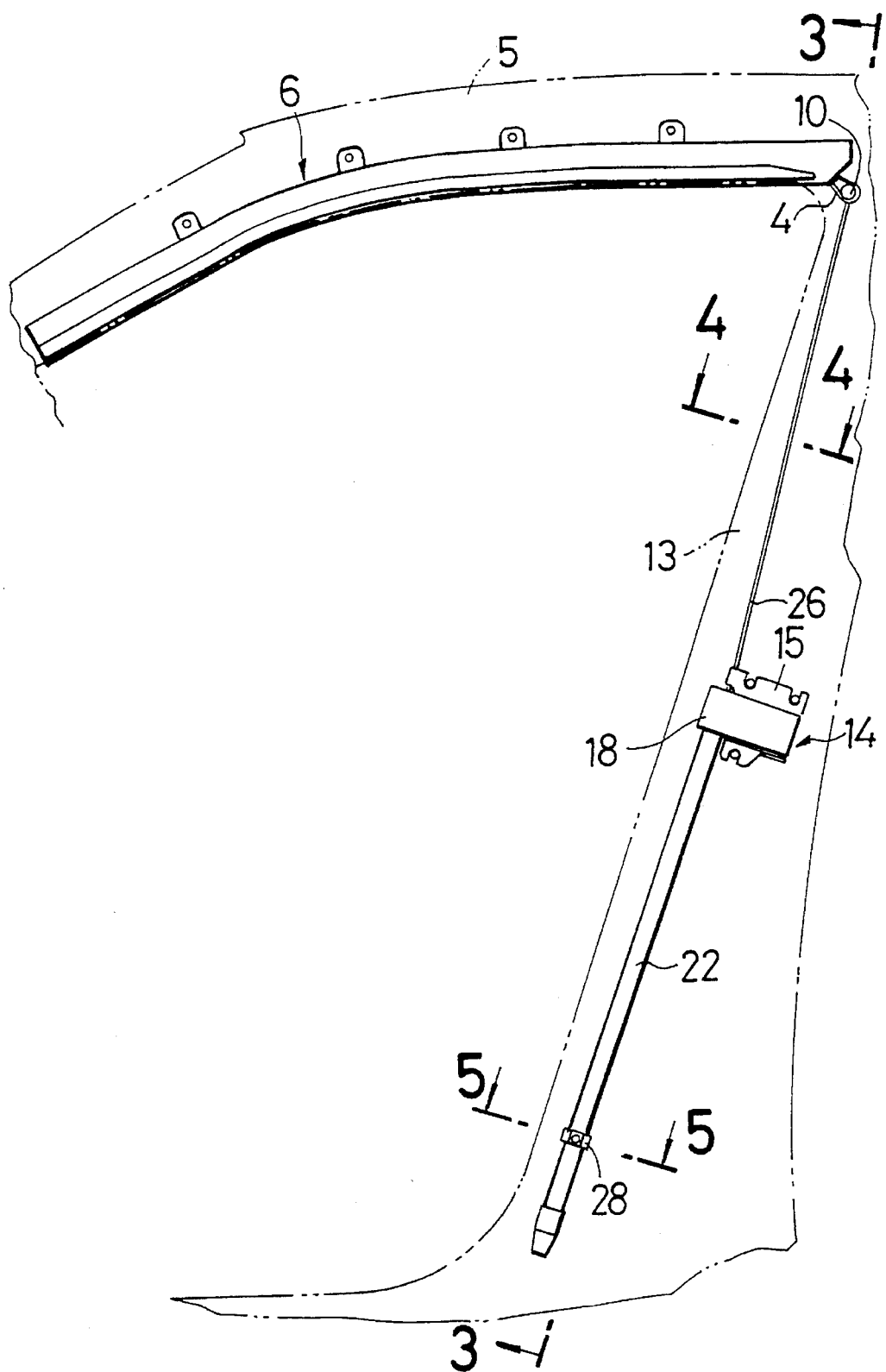
FIG. 1 is a view of an occupant protecting system for a vehicle according to a first embodiment of the present invention, as viewing from the outside of the vehicle body.
Figure 2:
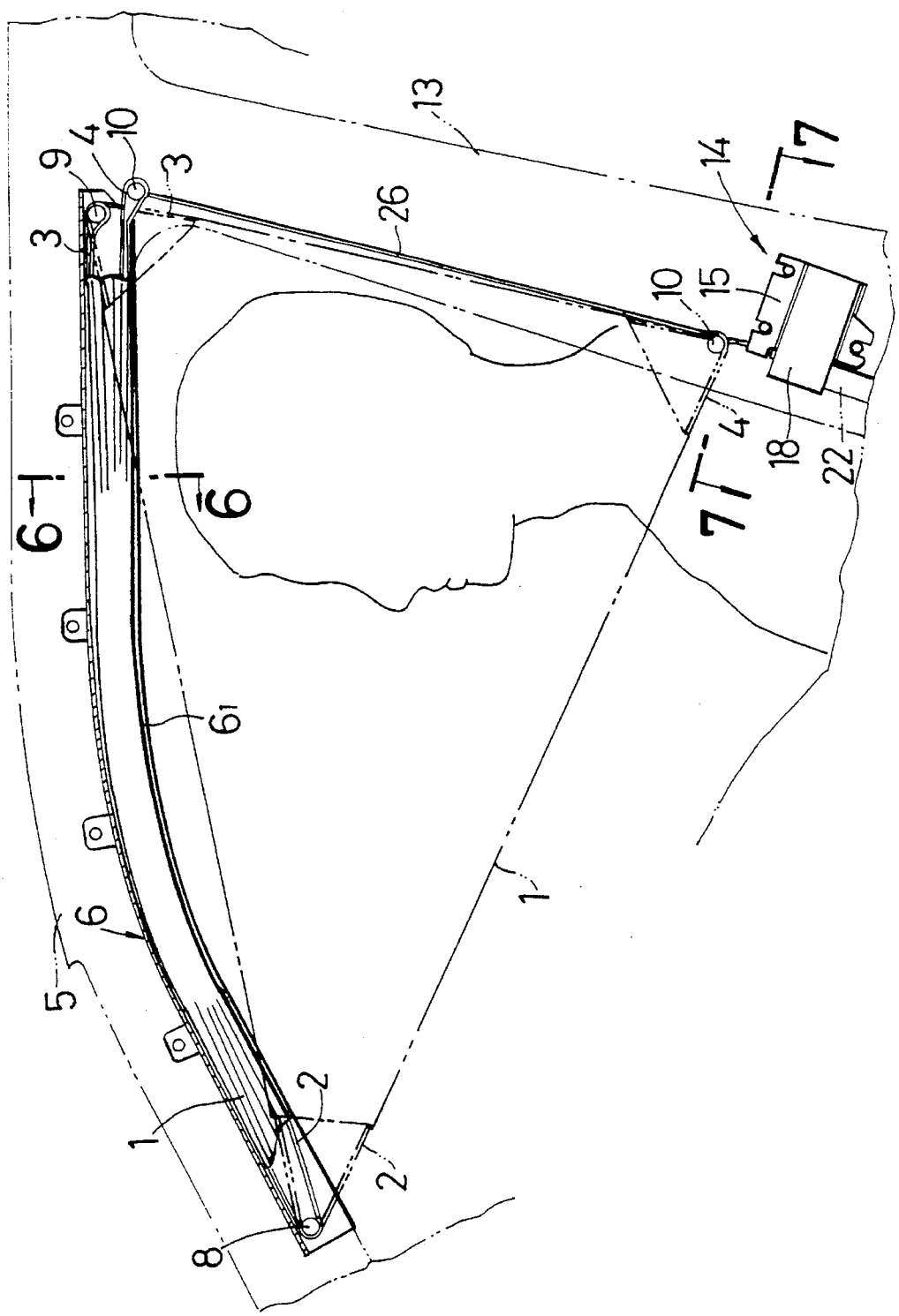
FIG. 2 is a partially broken-away view of the occupant protecting system shown in FIG. 1.

Referring first to FIGS. 1 to 9, there is illustrated an occupant protecting system for a vehicle according to a first embodiment of the present invention. The occupant protecting system includes a shock absorbing member 1, FIGS. 2 and 3B, formed into a triangular membrane from a nylon or polyester fabric, as used for an air bag. Strings 2, 3 and 4, FIG. 2, are tied to three apexes of the triangular shock absorbing member 1.

Figure 6:
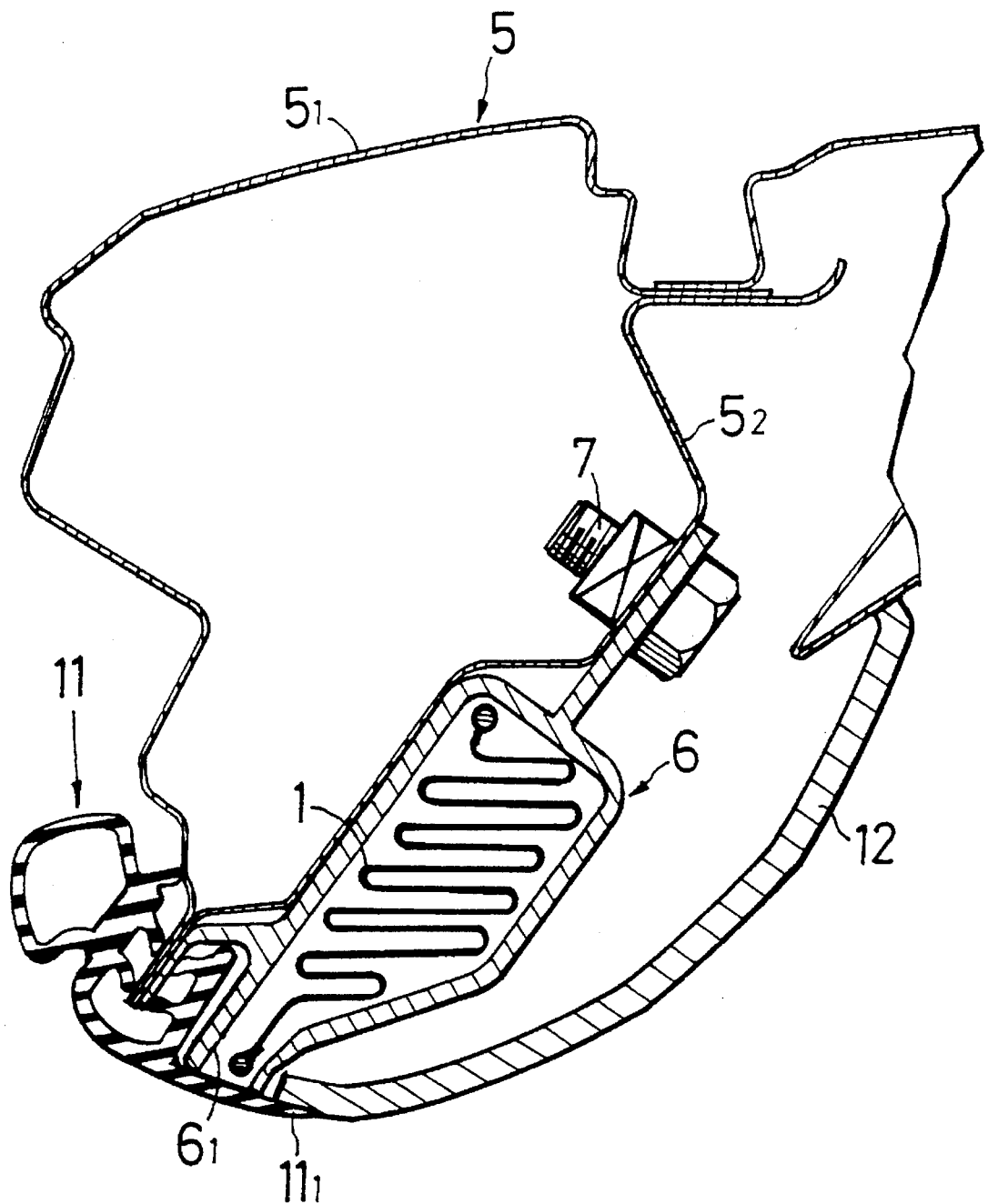
FIG. 6 is a sectional view taken along a line 6—6 in FIG. 2.

A roof rail 5, FIGS. 1, 2 and 6, constituting an upper edge of an opening at a front door, includes outer and inner panel panels $5_1$ and $5_2$, FIG. 6, welded to each other, and an accommodating casing 6, curved into an arcuate shape, is fixed to a lower surface of the inner panel $5_2$ by four bolts 7, FIGS. 1, 2 and 6. The front string 2, FIG. 2, is secured to a front end of the accommodating casing 6 through a front fixing pin 8 forming a fixing point, and the rear string 3 is secured to a rear end of the accommodating casing 6 through a rear fixing pin 9 forming a fixing point. Further, a movable pin 10 is secured to the lower string 4 and forms a movable point.

The shock absorbing member 1, FIGS. 2 and 3B, is folded into a fan-like configuration with a pivot provided by the front fixing pin 8, FIG. 2, and accommodated within the accommodating casing 6, FIG. 6. With the shock absorbing member 1 accommodated within the accommodating casing 6, a slit-like opening $6_1$ defined in a lower surface of the accommodating casing 6 is closed by a lip $11_1$, FIG. 6, formed integrally with a weather strip 11 for the door. At this time, the movable pin 10 is disposed at a location proximate to the rear fixing pin 9. The accommodating casing 6 is covered with a garnish 12, so that it is not exposed into the passenger compartment.

Figure 7:
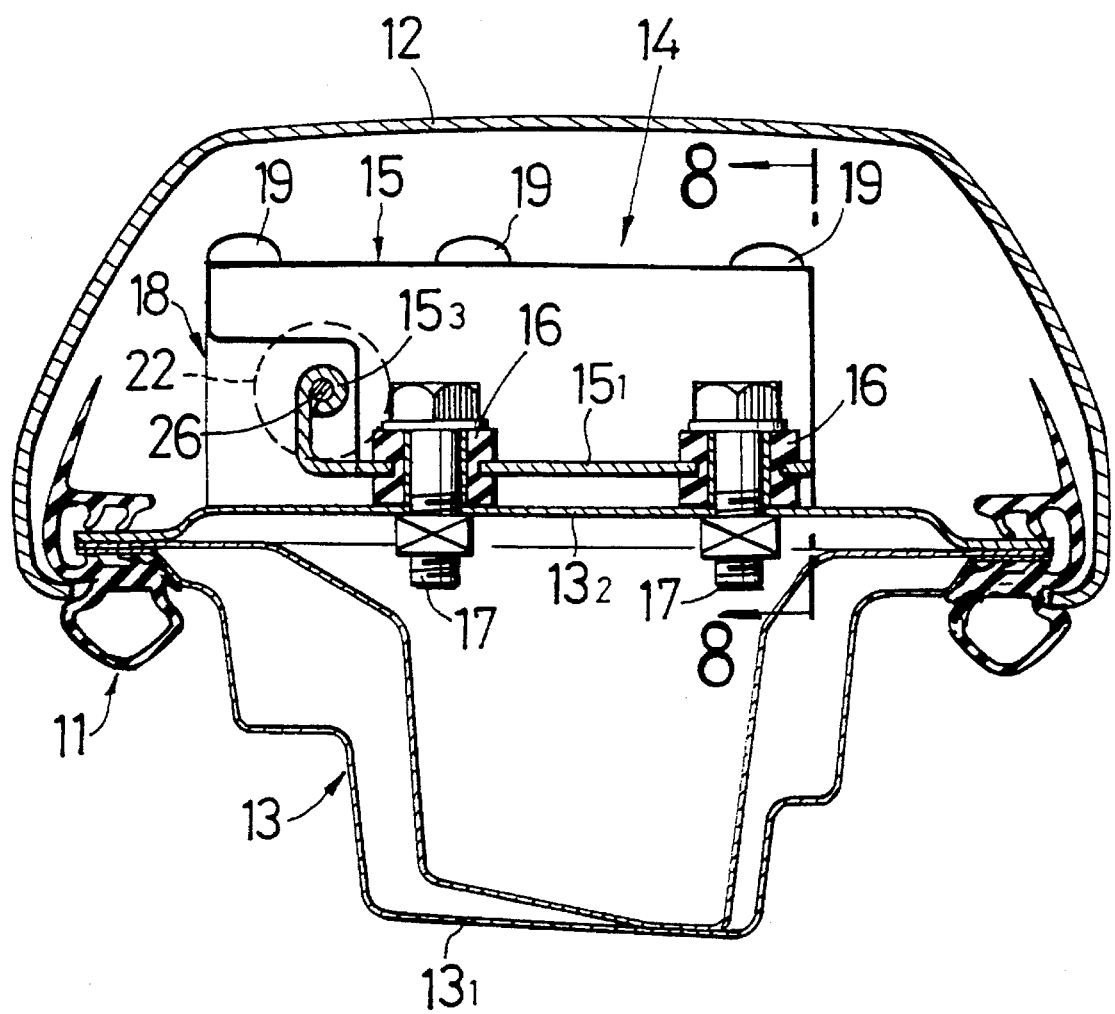
FIG. 7 is a sectional view taken along a line 7—7 in FIG. 2.

A center pillar 13, FIG. 2, constituting a rear edge of the opening at the front door, includes an outer panel $13_1$ and an inner panel $13_2$, FIG. 7. A developing means 14, for developing or unfolding the shock absorbing member 1, is held stationarily to the inner panel $13_2$ by a bracket 15 and covered with the garnish 12, so that it is not exposed into the passenger compartment.

Figure 8:
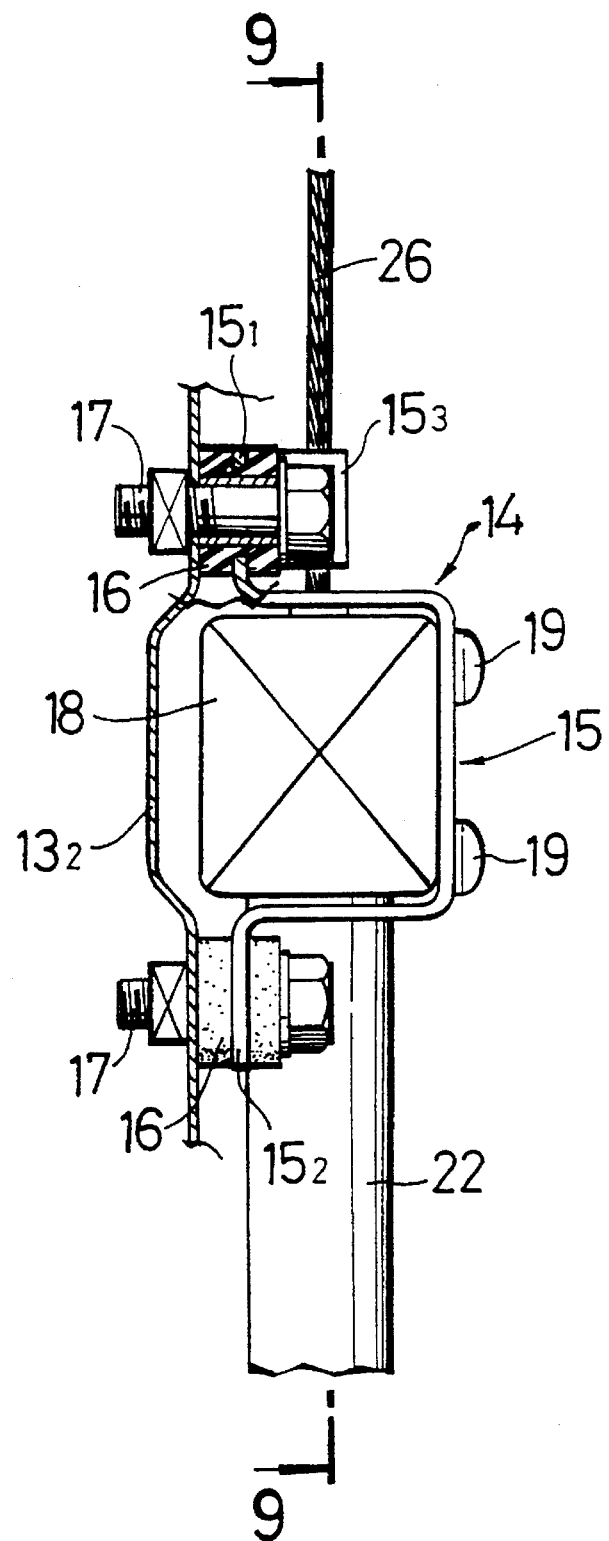
FIG. 8 is a sectional view taken along a line 8—8 in FIG. 7.
Figure 9:
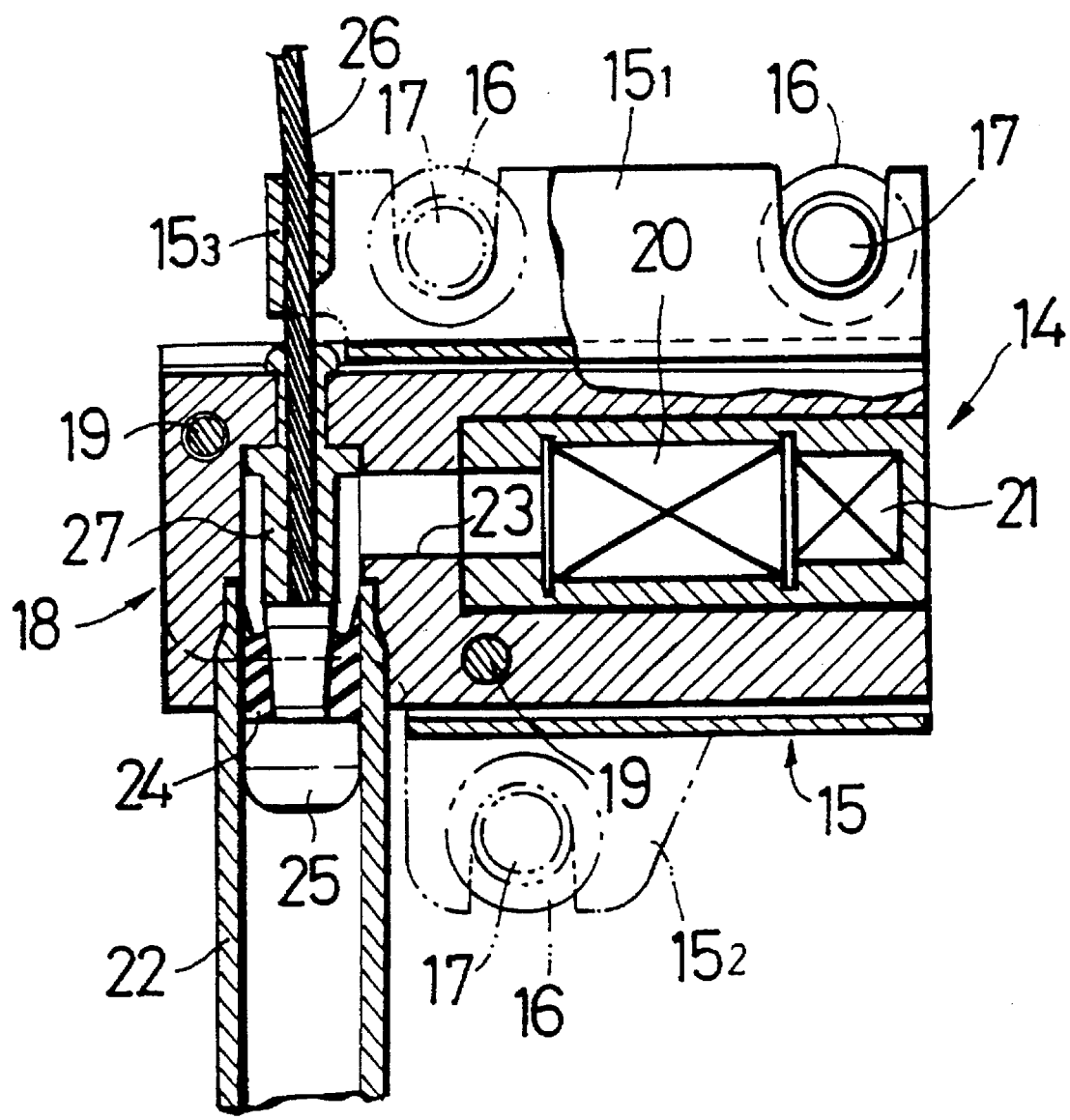
FIG. 9 is a sectional view taken along a line 9—9 in FIG. 8.

The bracket 15 includes a pair of flanges $15_1$ and $15_2$. One of the flanges $15_1$ is supported in a floating manner on the inner panel $13_2$ by bolts 17, 17 with a pair of rubber bushes 16, 16 interposed therebetween. The other flange $15_2$, FIGS. 8 and 9, is supported in a floating manner on the inner panel $13_2$ by a bolt 17 with a rubber bush 16 interposed therebetween. A gas generator 18, FIG. 8, for the developing means 14 has a rectangular parallelepiped shape and is fixed to the bracket 15 by three bolts 19.

Contained in the gas generator 18 are a propellant 20 for generating a high pressure gas by burning, and a squib 21, FIG. 9, for firing the propellant 20. A cylinder 22 extends along an inner surface of the inner panel $13_2$ of the center pillar 13 and coupled at its upper end to a front portion of the gas generator 18. The propellant 20 and the inside of the cylinder 22 are interconnected through a gas passage 23. A piston 25 is slidably received in the cylinder 22 and has a seal member 24 around an outer periphery thereof. A wire 26, coupled at its lower end to the piston 25, is guided by a guide member 27 mounted in the gas generator 18 and a guide $15_3$ provided on the bracket 15 to extend upwardly along the center pillar 13, and is coupled at its upper end, FIG. 2, to the movable pin 10 of the shock absorbing member 1.

Figure 5:
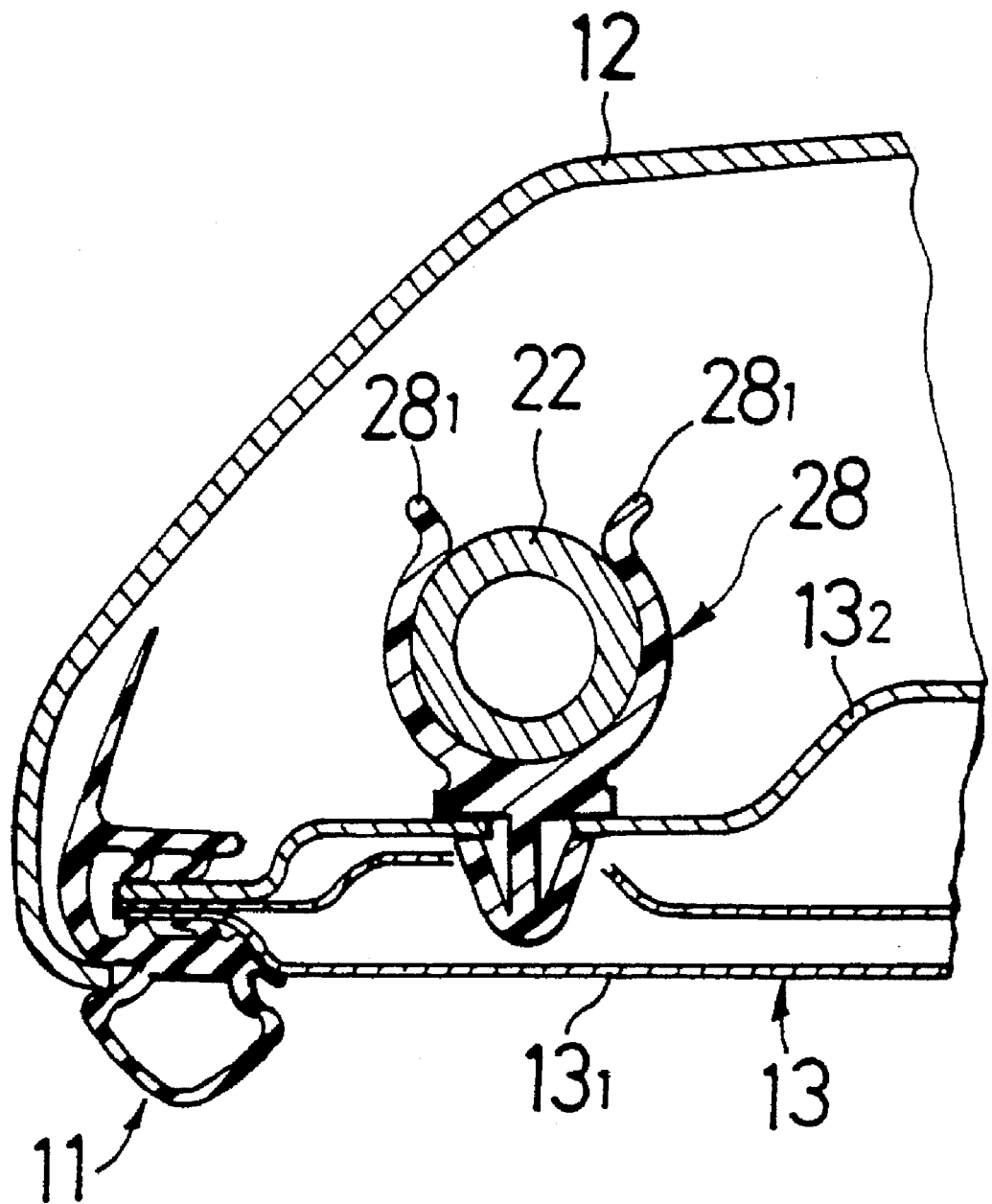
FIG. 5 is a sectional view taken along a line 5—5 in FIG. 1.

As can be seen from FIG. 5, the cylinder 22 is supported at its lower portion on a clip 28 mounted on the inner panel $13_2$ of the center pillar 13. The clip 28 includes a pair of grasping legs $28_1$, $28_1$ extending toward the inside of the vehicle body, so that the cylinder 22 is releasably grasped between both the grasping legs $28_1$, $28_1$.

Figure 4:
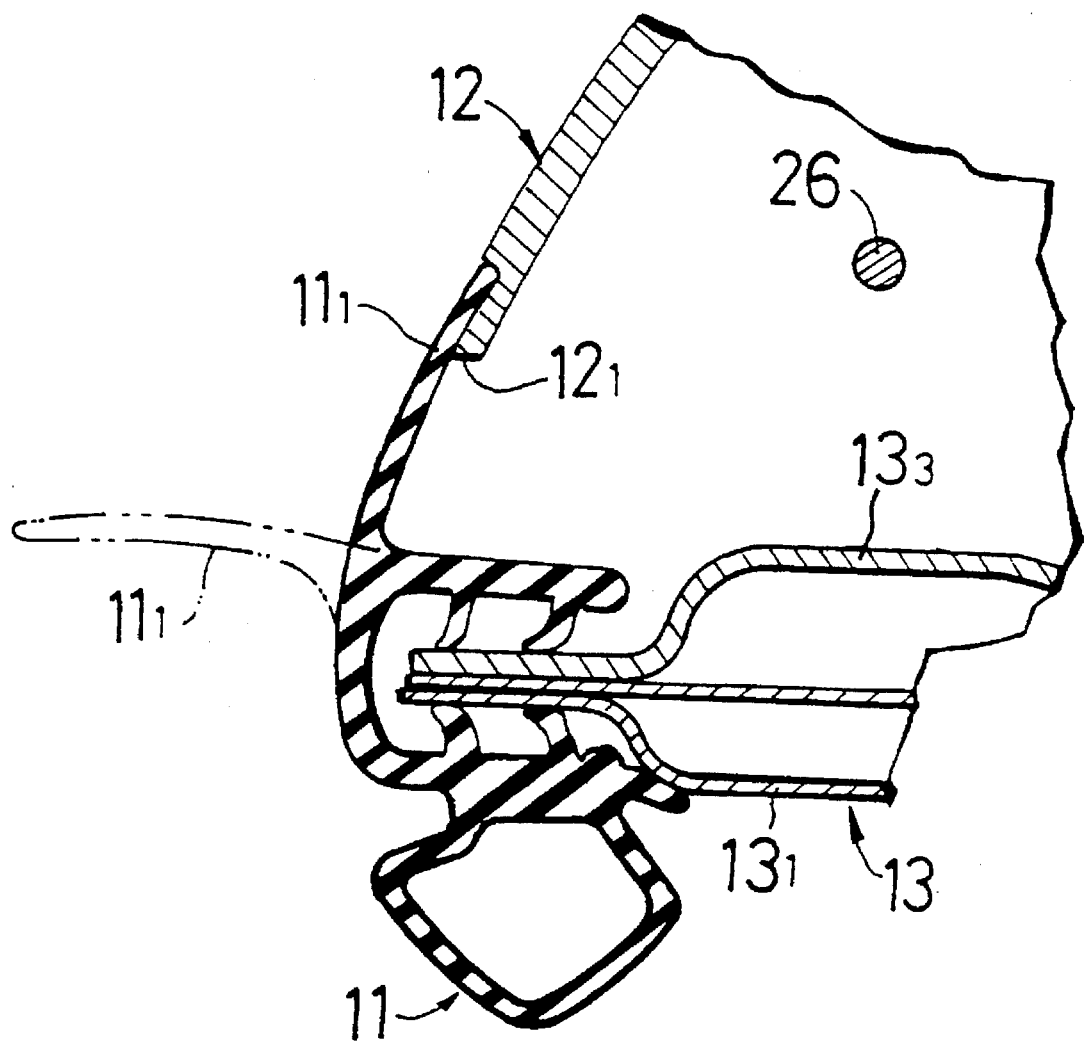
FIG. 4 is a sectional view taken along a line 4—4 in FIG. 1.

As can be seen from FIG. 4, the garnish 12, covering the inner surface of the center pillar 13, is provided with a slit-like opening $12_1$ connected to the opening $6_1$ at the accommodating casing 6 and closed by the lip $11_1$ formed integrally with the weather strip 11 for the door.

The operation of this embodiment of the present invention having the above-described construction will be described below.

When the collision of the vehicle has been detected by an acceleration sensor, not shown, the squib 21 of the gas generator 18 is energized to fire the propellant 22, thereby producing a high pressure gas which flows through the gas passage 23 into the cylinder 22 to urge the piston 25 downwardly. As a result, the movable pin 10 of the shock absorbing member 1 is pulled down through the wire 26 connected to the piston 25, so that the shock absorbing member 1 is pulled out of the opening $6_1$ in the accommodating casing 6 and is unfolded, or developed, between an occupant and the door while spreading the lip $11_1$ of the weather strip 11, FIG. 2. This makes it possible to prevent the direct contact of the occupant thrown out sideways by a shock with the door to absorb the shock applied to the occupant.

If the center pillar 13 is deformed inwardly of the vehicle body from a state as shown in FIG. 3A to a state as shown in FIG. 3B, the fracture and deformation of the cylinder 22 are prevented by disengagement of the lower end of the cylinder 22 from the grasping legs $28_1$, $28_1$ of the clip 28. At this time, a large load is prevented from being applied to a junction between the gas generator 18 and the cylinder 22 by the fact that the gas generator 18 is supported in the floating manner through the rubber bushings 16. The prevention of the fracture and deformation of the cylinder 22 ensures that the piston 25 can slide smoothly along the cylinder 22 to reliably unfold, or develop, the shock absorbing member 1.

Because the shock absorbing member 1 is the membrane-like member as described above, the shock absorbing member 1, when folded, is compact in size and can easily be accommodated in a narrower space. In addition, the shock absorbing member 1 is developed two-dimensionally and hence, can be developed in a smaller space and in a shorter time, as compared with the prior art air bag which is developed three-dimensionally. Moreover, the shock absorbing member 1, after being developed, is held stationarily at three points by the two fixing pins 8 and 9 and the single movable pin 10 and hence, exhibits a large shock-absorbing effect.

Figure 10:
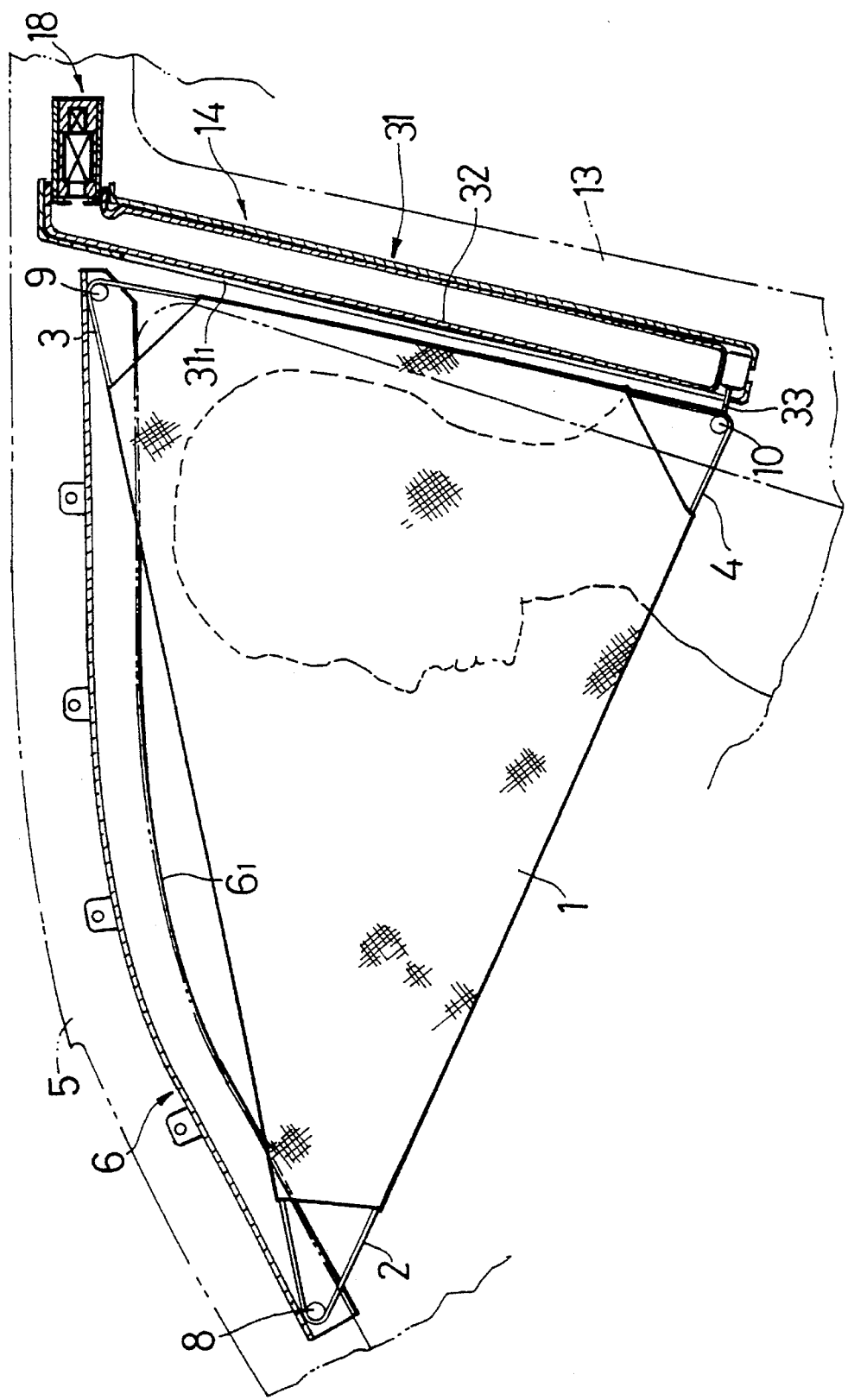
FIG. 10 is a view similar to FIG. 2, but illustrating an occupant protecting system for a vehicle according to a second embodiment of the present invention.

A second embodiment of the present invention will now be described in connection with FIG. 10.

A developing means 14, in the second embodiment, includes a guide sleeve 31, mounted on the center pillar 13. A bag 32, folded in a bellows-like configuration, is accommodated in an upper portion of the guide sleeve 31. A lower end of the bag 32 is connected with the movable pin 10 of the shock absorbing member 1 through a connecting member 33 which is slidably guided in a slit-like guide groove $31_1$ defined along the guide sleeve 31. When the gas generator 18 mounted at an upper end of the guide sleeve 31 generates a high pressure gas, upon collision of the vehicle, the bag 32 is expanded in the guide sleeve 31 into a state as shown in FIG. 10 to develop the shock absorbing member 1.

Figure 11:
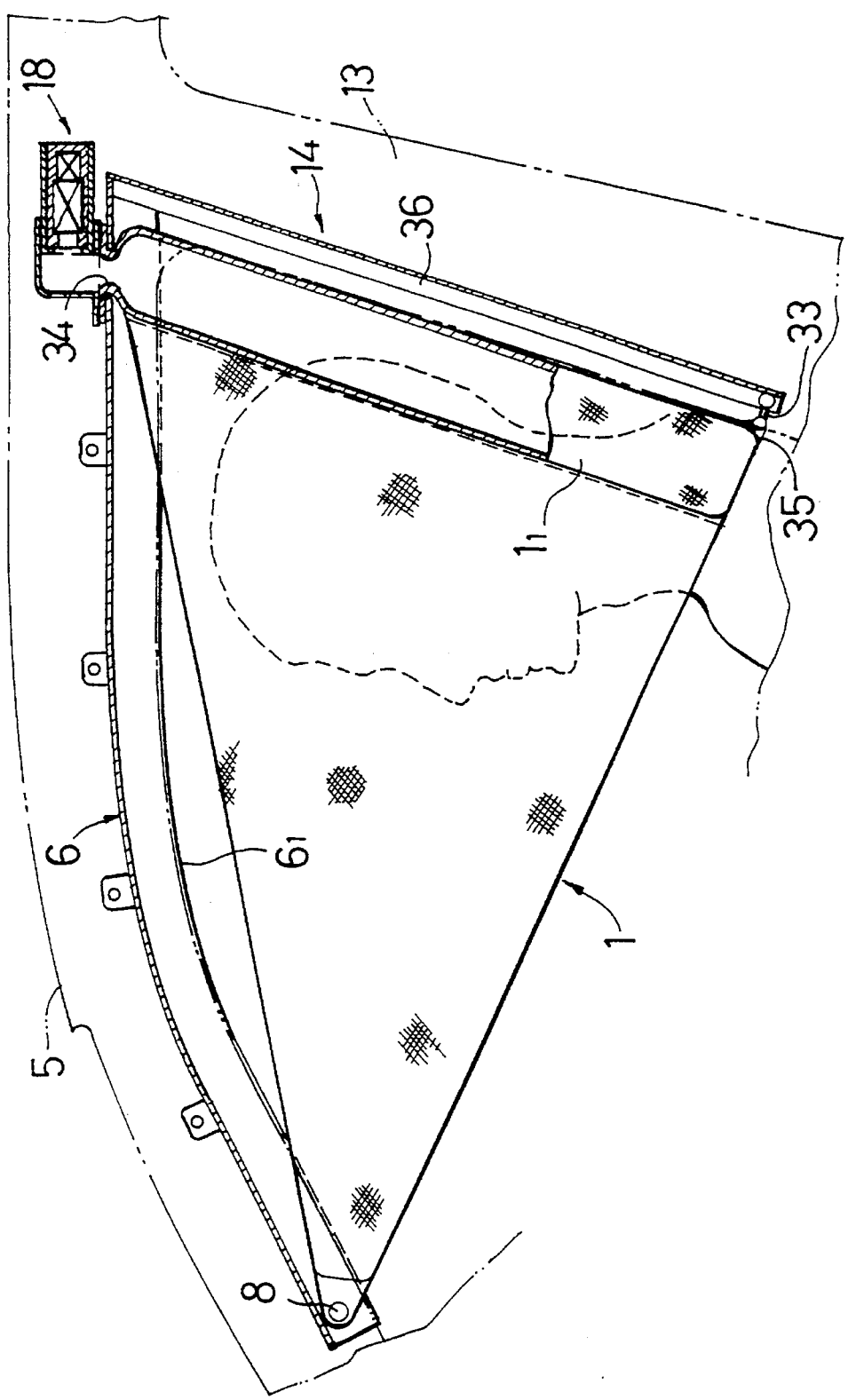
FIG. 11 is a view similar to FIG. 2, but illustrating an occupant protecting system for a vehicle according to a third embodiment of the present invention.

A third embodiment of the present invention will now be described in connection with FIG. 11.

A developing means 14, in the third embodiment, includes a hollow structure $1_1$ formed along a rear edge of the shock absorbing member 1. The hollow structure $1_1$ is provided at an upper end thereof with a fixed point 34 connected to the gas generator 18. A connecting member 33, mounted at a movable point 35 at a lower end of the hollow structure $1_1$, is slidably supported for sliding movement on a guide rail 36 mounted along the center pillar 13. When the shock absorbing member 1 is accommodated within the accommodating casing 6, the hollow structure $1_1$ is accommodated in a folded state, as is the membrane-like portion. When the gas generator 18 generates a high pressure gas upon collision of the vehicle, the hollow structure $1_1$ is expanded along the guide rail 36 to develop the shock absorbing member 1 into a state as shown in FIG. 11.

Figure 12:
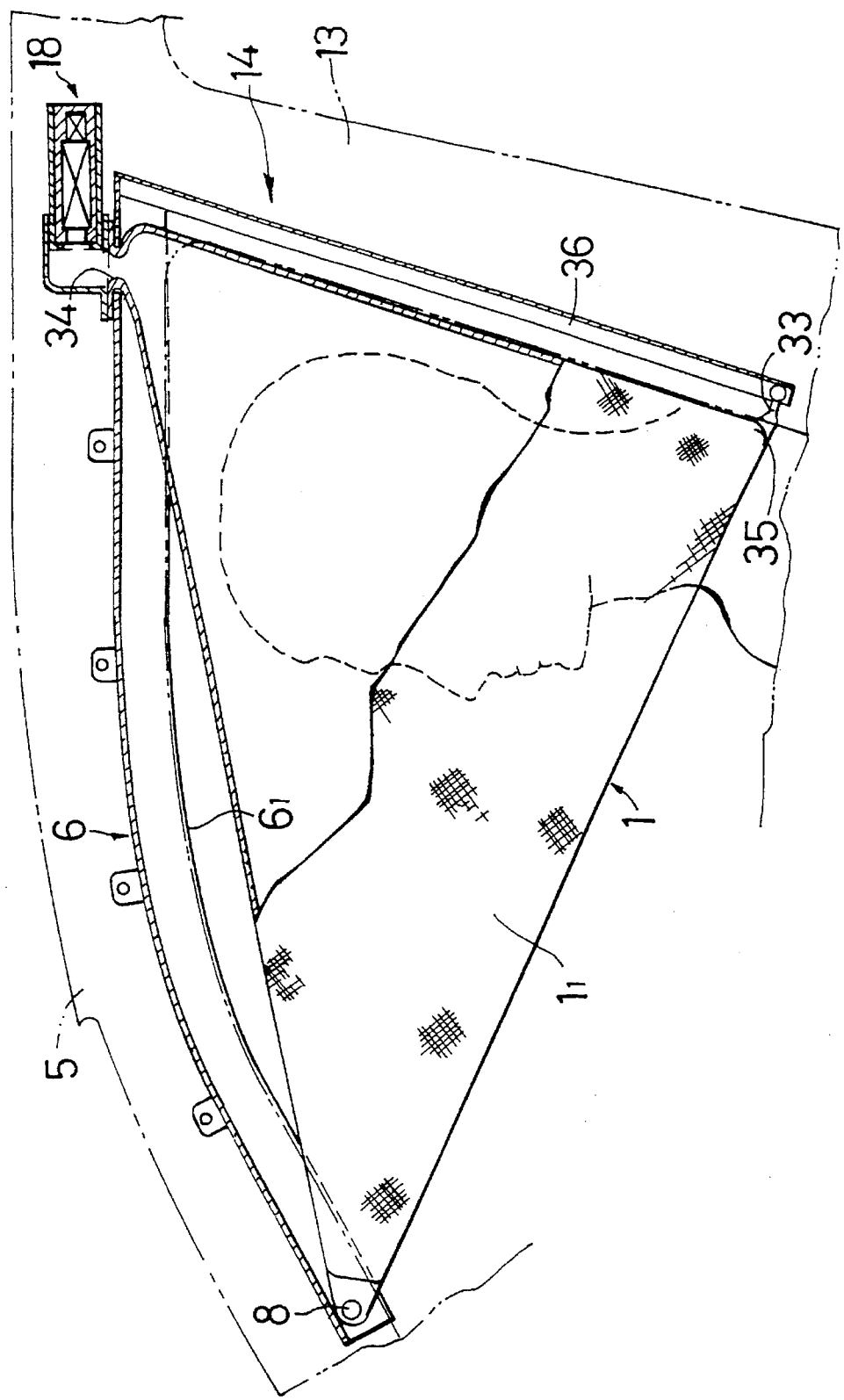
FIG. 12 is a view similar to FIG. 2, but illustrating an occupant protecting system for a vehicle according to a fourth embodiment of the present invention.

A fourth embodiment of the present invention will now be described in connection with FIG. 12.

In the fourth embodiment, the entire shock absorbing member 1 is formed into a hollow structure $1_1$. When a high pressure gas is supplied from the gas generator 18 into the hollow structure $1_1$, the shock absorbing member 1 is developed into a state as shown in FIG. 12, while its fixed point 35 is being guided.

Although the embodiments of the present invention have been described in detail, it will be understood that the present invention is not limited to these embodiments, and various modifications in design can be made without departing from the spirit and scope of the invention defined in claims.

Figure 13A:
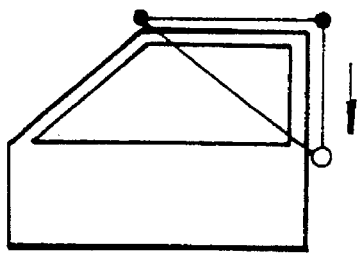
FIGS. 13A to 13E are views of occupant protecting systems for a vehicle according to further embodiment of the present invention.
Figure 13D:
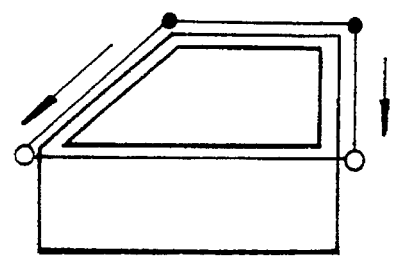
Figure 13B:
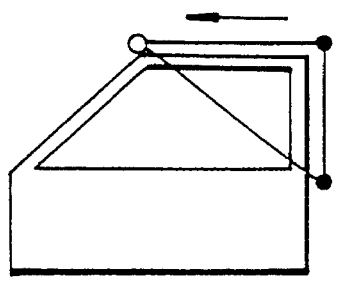
Figure 13E:
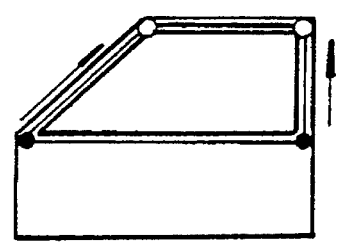
Figure 13C:
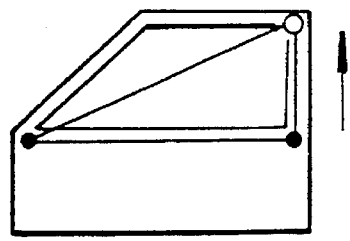

For example, although the shock absorbing member is accommodated along the roof rail as shown in FIG. 13A in the first to fourth embodiments, the shock absorbing member may be accommodated along the center pillar, so that the movable point may be moved along the roof rail, as shown in FIG. 13B, or the shock absorbing member may be accommodated in the door, so that the movable point may be moved along a sash at the rear edge of the door, as shown in FIG. 13C. In addition, the number of each of the fixed points and the movable points may be two, and the movable points at opposite ends of the shock absorbing member accommodated along the roof rail may be moved along the center pillar and a front pillar, as shown in FIG. 13D, or the movable points at opposite ends of the shock absorbing member accommodated along the door may be moved along sashes at the front and rear edges of the door, as shown in FIG. 13E. Further, the occupant protecting system for the vehicle according to the present invention is not limited to be mounted to the side of the vehicle body, and may be mounted in any location along a front window or a rear window.

What is claimed is:

1. An occupant protecting system for a vehicle, comprising:

a shock absorbing membrane member of a substantially triangular configuration which is folded in an inoperative state of the system and is unfoldable and developed between a vehicle body and an occupant upon collision of the vehicle, said membrane member having fixed points at two corner portions which are fixed to a vehicle body and having one movable point which is located near one of said fixed points when said membrane member is folded, said movable point being movable substantially straightforwardly along the vehicle body away from said one fixed point when said membrane member is unfolded; and developing means for developing said shock absorbing membrane member by moving said movable point upon collision of said vehicle.

2. An occupant protecting system for a vehicle according to claim 1, wherein said developing means includes a cylinder supported on the vehicle body, a piston slidably received in said cylinder, a wire connecting said piston to the movable point of said shock absorbing member, and a gas generator for generating a high pressure gas for driving said piston.

3. An occupant protecting system for a vehicle according to claim 1, wherein said developing means includes a guide sleeve supported on the vehicle body, a bag expandably accommodated in said guide sleeve and connected to the movable point, and a gas generator for generating a high pressure gas for expanding said bag.

4. An occupant protecting system for a vehicle according to claim 1, wherein said shock absorbing member comprises a hollow structure forming at least a portion thereof, said movable point being provided on said hollow structure, wherein said developing means includes a guide rail supported on the vehicle body to guide the movable point and a gas generator for generating a high pressure gas for developing said hollow structure of said shock absorbing member.

5. An occupant protecting system for a vehicle according to claim 1, 2, 3 or 4, wherein said shock absorbing member is accommodated in an accommodating means provided at an end of a roof of the vehicle body, and said developing means is mounted to a pillar portion.

6. An occupant protecting system for a vehicle according to claim 5, wherein said accommodating means is mounted to a roof rail and covered with a garnish.

7. An occupant protecting system for a vehicle according to claim 1, 2, 3, or 4, wherein said developing means has a plurality of mounted points to the vehicle body and at least one of the mounted points is separable from the vehicle body as a result of deformation of a portion of the vehicle body around the developing means.

* * * * *